(12) United States Patent
Ramsundar

(10) Patent No.: US 11,022,091 B2
(45) Date of Patent: Jun. 1, 2021

(54) PLANKZ BUOYANCY ENGINE

(71) Applicant: Pallant Satnarine Ramsundar, Chester, VA (US)

(72) Inventor: Pallant Satnarine Ramsundar, Chester, VA (US)

(*) Notice: Subject to any disclaimer, the term of this patent is extended or adjusted under 35 U.S.C. 154(b) by 119 days.

(21) Appl. No.: 16/386,864

(22) Filed: Apr. 17, 2019

(65) Prior Publication Data
US 2020/0332760 A1 Oct. 22, 2020

(51) Int. Cl.
*F03B 17/06* (2006.01)
*F03B 17/02* (2006.01)

(52) U.S. Cl.
CPC .............. *F03B 17/06* (2013.01); *F03B 17/02* (2013.01); *Y02E 10/20* (2013.01)

(58) Field of Classification Search
CPC .......... F03B 17/06; F03B 17/04; F03B 17/02; Y02E 10/20
See application file for complete search history.

(56) References Cited

U.S. PATENT DOCUMENTS

| 1,708,807 | A | 4/1929 | Tatay |
| 2,135,110 | A | 11/1938 | Platt |
| 4,326,132 | A | 4/1982 | Bokel |
| 6,249,057 | B1 * | 6/2001 | Lehet ...................... F03B 17/02 290/1 R |
| 8,981,582 | B2 * | 3/2015 | Grossman ............... F03B 17/04 290/1 R |
| 10,584,687 | B2 * | 3/2020 | Filloramo ............... F03B 17/04 |
| 2008/0028760 | A1 | 2/2008 | Bedwell |
| 2009/0309373 | A1 * | 12/2009 | O'Briant ................ H02K 53/00 290/1 R |
| 2010/0180587 | A1 * | 7/2010 | Manakkattupadeettathil ............. F03G 3/04 60/495 |
| 2012/0159941 | A1 * | 6/2012 | Pirincci .................. H02K 53/00 60/495 |
| 2012/0198833 | A1 * | 8/2012 | Francis ................... F03B 17/04 60/496 |
| 2012/0312008 | A1 * | 12/2012 | Campos Alvarez .... F03B 17/04 60/495 |
| 2020/0191113 | A1 * | 6/2020 | Filloramo ............... F03B 17/02 |

FOREIGN PATENT DOCUMENTS

EP 3231862 A1 * 10/2017 ........... C12G 1/0203

* cited by examiner

*Primary Examiner* — Michael C Zarroli

(57) ABSTRACT

The Buoyancy engine is a machine that captures buoyancy forces on floats in a liquid column and converts it to rotational energy that can be used to drive other equipment or generate electricity. This invention uses separate systems for the float, drive system and valve mechanism to ensure energy extraction. Additionally, a gravity assist system returns liquid exhausted by valve operation to the liquid column to maintain a net energy gain.

13 Claims, 3 Drawing Sheets

PLANKZ BUOYANCY ENGINE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

This invention is in the field of power generation. More specifically, this invention captures lift energy due to buoyancy and transfers it to mechanical rotation. The mechanical rotation can be used to power various devices including electrical generators.

BACKGROUND OF THE INVENTION

The buoyancy forces on objects submerged in liquids is significant and utilized in day to day events like sailing ships and flotation devices. However, to date, attempts to transform buoyancy forces to dynamic power generation has not been successfully demonstrated.

A common approach is typified in a 1929 U.S. Pat. No. 1,708,807 as well as in a more recent US Patent 2008/0028760. The approach described in these patents utilize a connected chain of flotation devices passing through a liquid column, with a sealing device at the bottom of the column to reduce liquid loss. Difficulties in these designs are due to high forces on floats entering at the bottom of liquid column that slowed the connected floats and effectively neutralized energy capture. Liquid loss at the seal also contributed to energy inefficiency, and the systems required liquid replenishment for continuous operation which negatively impacted commercial feasibility.

Another approach typified by a 1938 U.S. Pat. No. 2,135,110 and a more recent 1980 U.S. Pat. No. 4,326,132 utilize a connected chain of buckets submerged in liquid. A stream of air is injected into a bucket at the lowest point in the chain to provide lift. Difficulties in this approach is the cost of providing the compressed air and the rate at which air can injected into the buckets to obtain a net energy gain from the device.

The invention described in this application utilizes an innovative seal system to introduce floats at the bottom of a liquid column, but utilizes independent floats that drives a belt system to capture the buoyancy forces. This design captures the buoyancy forces from all the floats without losses incurred when introducing a new float into the liquid column. The seal system proposed, that is integrated with the floats, also ensures a high rate of float introduction that is essential for high power generation. This invention additionally includes a liquid recovery system that harnesses gravity to recycle liquid losses from the seal and significantly reduces the need for virgin liquid replenishment.

BRIEF SUMMARY OF THE INVENTION

The present invention is a system that captures the buoyancy forces from rising floats in a liquid column and transfers it to mechanical motion of a continuous belt, which can be captured to drive other equipment, or for power generation.

In one aspect of the invention, a special seal system introduces floats into the bottom of a liquid column.

In another aspect of the invention, the floats rising in the liquid column are captured by a continuous belt system. The buoyancy forces of the rising floats cause the continuous belt to move, turning support Drive Wheels that retain the continuous belt. The movement of the rotating belt provides power that can be used to drive equipment or generators.

In another aspect of the invention, liquid losses through the seal system are recovered with the assistance of gravity.

DETAILED DESCRIPTION OF THE INVENTION

The PLANKZ BUOYANCY ENGINE™ is a machine that captures buoyancy forces on floats submerged in a liquid column, to move a continuous belt. The motion of the continuous belt causes the Drive Wheels supporting the continuous belt to turn. The rotational motion of the supporting Drive Wheels can be used to power other devices and to generate electricity.

Figure 1:
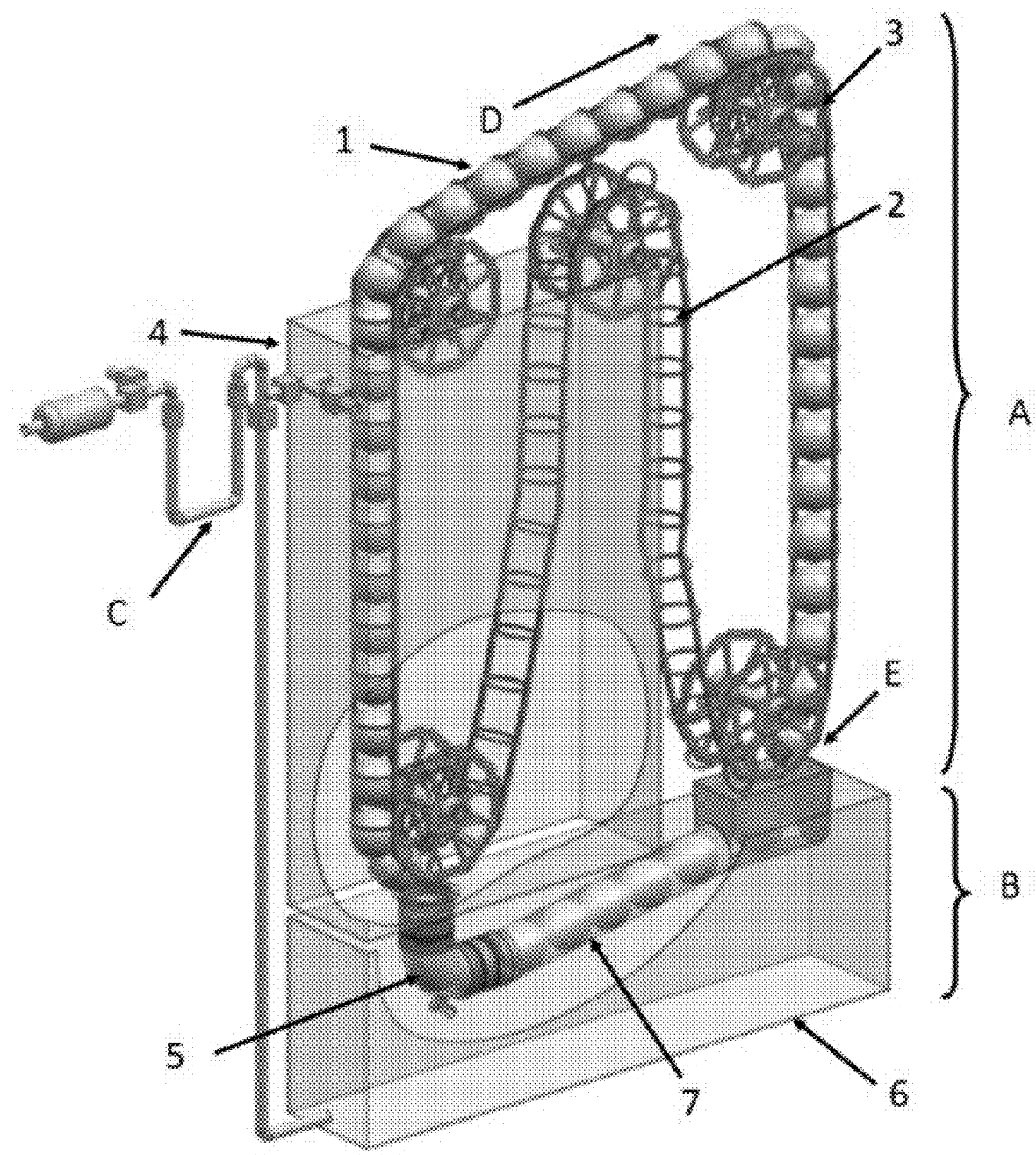
FIG. 1 gives an trimetric view of the working components of the invention. Support members, cowling, sensing and control elements are not shown so as to provide an unobstructed view of the mechanisms being described. Portions of the walls of liquid containers are cut-away for the same reason.

FIG. 1 shows an overview of the components of the invention. The invention can be sub-divided into three functional areas A, B and C with A being the Drive System, B the Float Return System and C the Liquid Recovery System.

The Drive System consists of a continuous belt made up of a series of connected bridges 2, supported on Drive Wheel Assemblies 3. Floats 1 are spherical balls that fit on 2 and maintained in position by guides, not shown in the drawing. The path of the continuous belt is designed such that it picks up floats at the bottom of the Liquid Column 4. Floats exert an upward force on the bridges, causing the continuous belt to move in the direction D. In operation of the machine, the Floats will move along the Continuous Belt until it reaches the position E, where the Floats fall into the Float Return System.

Figure 2:
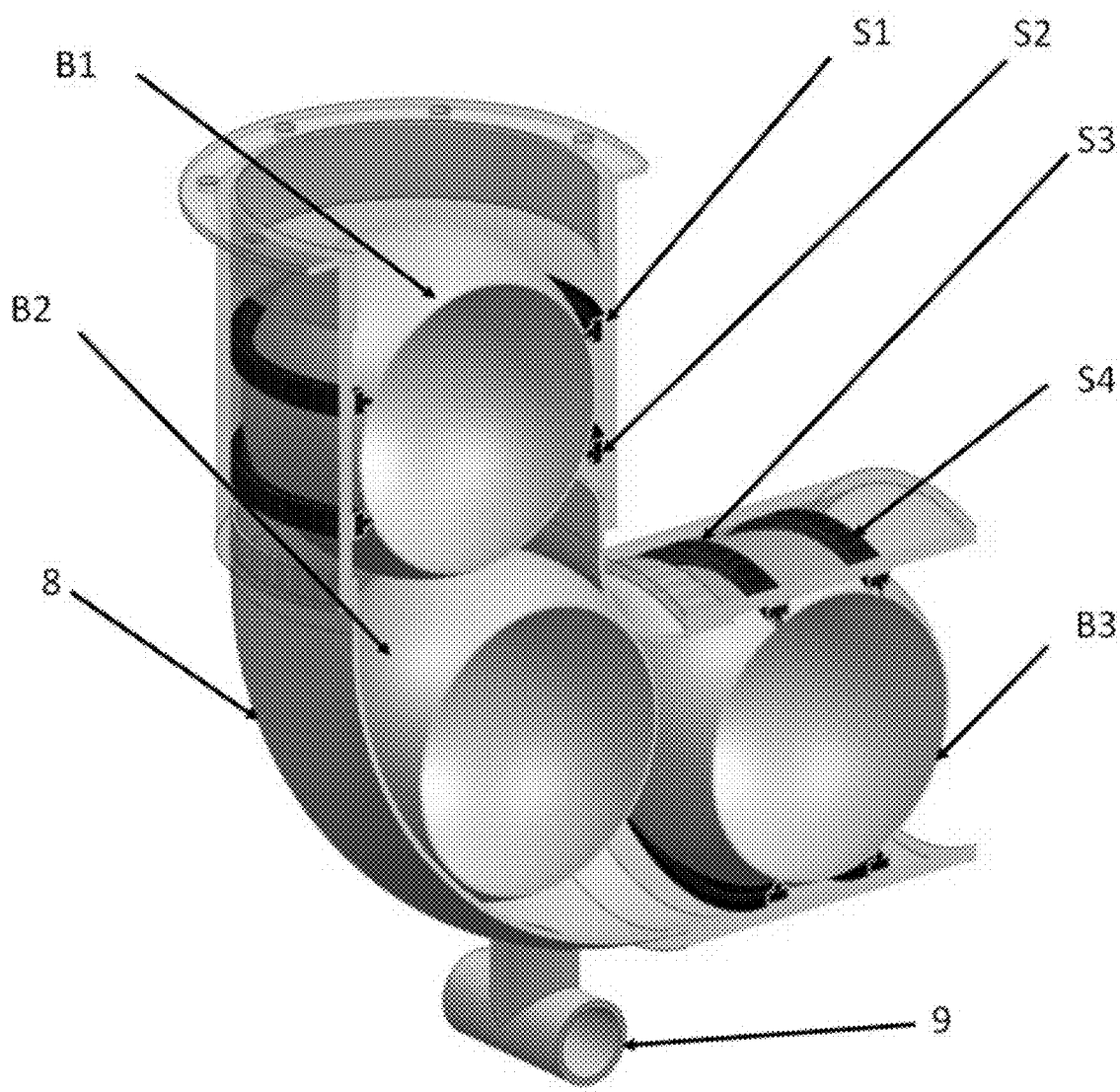
FIG. 2 shows a trimetric detail of the Float Return Valve, also with a cut-away to show internal components.

The Float Return System is contained in the Overflow Tank 6. Floats leaving the Drive System, move along the Feed Tube 7, into the Float Return Valve 5. FIG. 2 gives details of the Float Return Valve. The outer body of 5 is a 90-degree bend 8 fitted with an Inlet/Outlet Connector 9. Integral to the operation of 5 are the four seals S1, S2, S3 and S4. To explain the operation of 5, we start at the position illustrated in FIG. 2, which shows three Floats B1, B2 and B3 in place, with the all four seals pressing against the mating Float, and liquid filling the space on top of B1, as well as the space between B1 and B3. The next sequence of operation of 5 is as follows:

I. The seal of S1 is released causing B1 to rise into Liquid Column because of its buoyancy, where it pushes against the Bridges of the Continuous Belt.
II. S1 is restored to the seal position.
III. S2 is released causing B2 to rise due to buoyancy forces, where it is stopped by S1 which is in the seal position.
IV. S2 is restored to the seal position so that B2 is now sealed between S1 and S2.
V. The liquid between B2, (now held between S1 and S2), and B3 (which is sealed by S3 and S4), is exhausted through 9.
VI. S3 is released causing B3 to roll into the curved portion of 8.
VII. S3 is restored to the seal position.
VIII. S4 is released allowing a new Float from 7 to stop against S3.
IX. S4 is restored to the seal position.
X. The space between B2 and the new Float sealed between S3 and S4 is filled with liquid.

At this stage, 5 is restored to the condition at the start of the above sequence and the process can be repeated.

Figure 3:
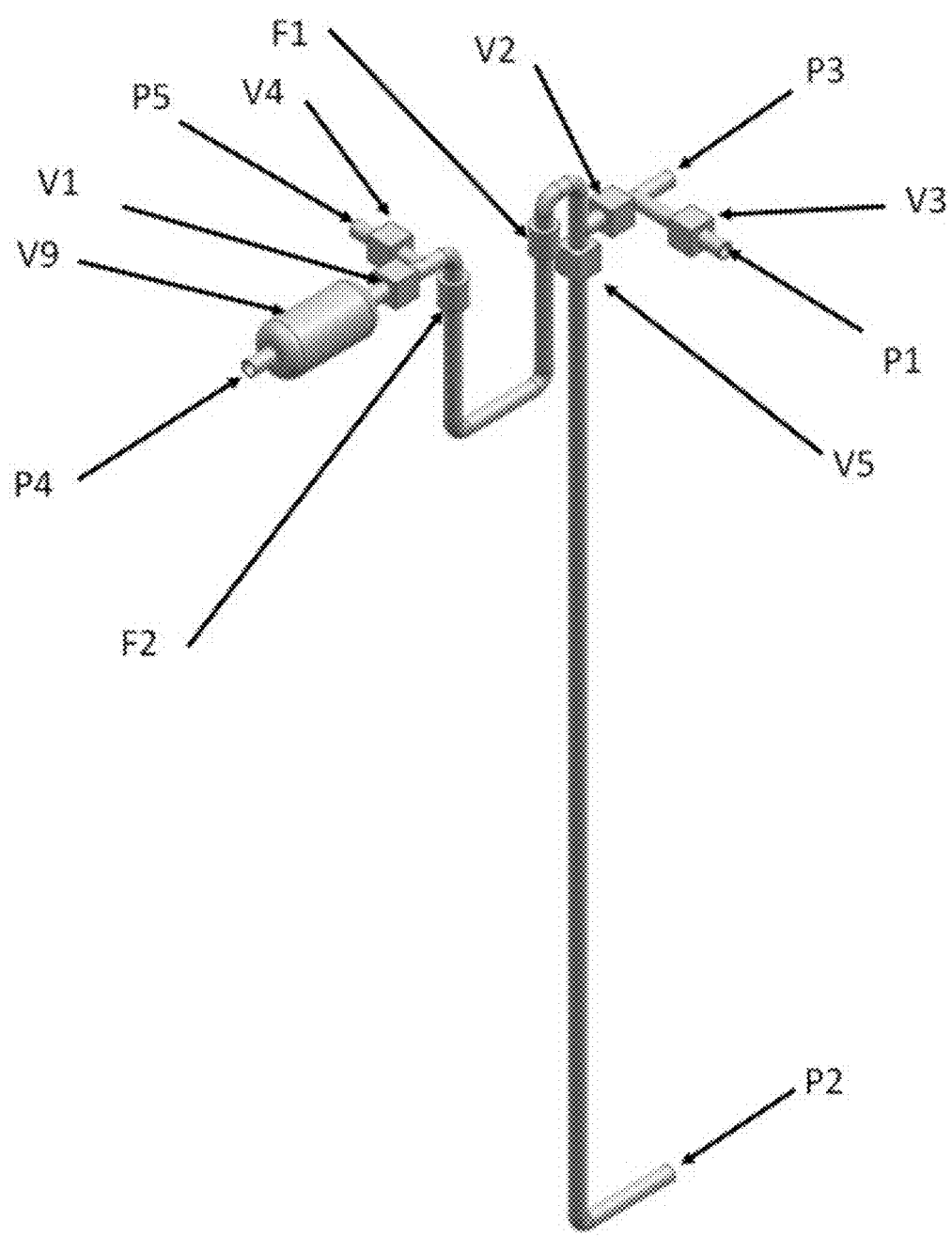
FIG. 3 shows an isometric illustration of the liquid recovery system.

The liquid lost in sequence V described above is recovered by C illustrated in FIG. 3. The port P2 is connected to 6. The port P1 is connected to the liquid supply by valve V3. Port P3 is connected to 4. Port P4 is connected to a vacuum. Port P5 is open to the atmosphere. C utilizes the principle of gravity where a liquid column in vacuum, would rise the equivalent of atmospheric pressure. A series of valves V1, V2, V4, V5 and flow sensors F1 and F2, would detect liquid levels and control movement of liquid from 6 and return it to 4. V9 is a fluid gas separator to restrict liquid flow to the vacuum. Where the liquid column is higher than an atmospheric column, multiple units of C can be used to move liquid to refill 4.

The machine will additionally be fitted with support, safety, esthetic and control elements as well as varying mechanisms to capture energy and transfer power.

The advantages of the present invention, without limitation, are:
a) It provides a pollution free source of power that is constant, reliable and comparatively inexpensive. Other green energy solutions like Solar and Wind are highly variable in output due to environmental conditions.
b) The PLANKZ BUOYANCY ENGINE™ can be used in any location on earth as well inside buildings. Other green energy solutions like Solar and Wind have limitations based on climatic conditions and require outdoor placement.
c) It does not require fuel for its operation as is the case for back-up generators based on the internal combustion engine.
d) The liquid medium expelled during cycling of the machine is largely recovered with the assistance of gravity, so that the machine shows a net positive energy output. Liquid lost is limited to evaporative losses.
e) In cases where the utilities offer power buy-back programs, the PLANKZ BUOYANCY ENGINE™ can generate revenue.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:
1. A buoyancy engine providing energy by capturing buoyancy forces on a plurality of floats and converting the buoyancy forces to rotational motions generating electrical power or driving other equipment, the buoyancy engine comprising:
a drive system comprising:
a continuous belt, and
a plurality of wheels contacting the continuous belt,
a float return system comprising:
a float return valve, and
a liquid recovery system,
wherein the drive system further comprises
a plurality of bridges connected to the continuous belt, and
a liquid column,
wherein the float return valve comprises
a first seal,
a second seal, a third seal, and
a fourth seal,
wherein the plurality of floats are of a spherical shape,
wherein the first seal and the second seal are configured to interact with a first selected float of the plurality of floats so as to seal an outlet of the float return valve,
wherein the third seal and the fourth seal are configured to interact with a second selected float of the plurality of floats so as to seal an inlet of the float return valve; and
wherein a float of the plurality of floats pushes against a bridge of the plurality of bridges when the float is in the liquid column.
2. The buoyancy engine of claim 1,
wherein the liquid column comprises
an entry hole allowing passage of the plurality of floats;
a liquid entry port;
a liquid exit port; and
a plurality of devices to measure and maintain a state of liquid if the liquid column.
3. The buoyancy engine of claim 1,
wherein the plurality of wheels support the continuous belt.
4. The buoyancy engine of claim 1, wherein the plurality of floats in the liquid column push against the plurality of bridges of the continuous belt causing the continuous belt to move.
5. The buoyancy engine of claim 1,
wherein the float return system further comprises
a flow return section; and
wherein a first end of the flow return section collects the plurality of floats from an exit of the drive system.
6. The buoyancy engine of claim 1,
wherein the first seal interacts with an upper hemisphere of the first selected float of the plurality of floats;
wherein the second seal interacts with a lower hemisphere of the first selected float of the plurality of floats;
wherein the third seal interacts with a left hemisphere of the second selected float of the plurality of floats; and
wherein the fourth seal interacts with a right hemisphere of the second selected float of the plurality of floats.
7. The buoyancy engine of claim 1,
wherein a pre-determined sequence of opening and closing of the first seal, the second seal, the third seal, and the fourth seal sequentially feed the plurality of floats through the float return valve.

8. The buoyancy engine of claim 7,
  wherein the pre-determined sequence of opening and closing of the first seal, the second seal, the third seal, and the fourth seal is controlled by pneumatic, mechanical, electrical, electronic or magnetic means.

9. The buoyancy engine of claim 1,
  wherein a port connecting the liquid recovery system to the liquid column.

10. The buoyancy engine of claim 1,
  wherein the float return system is contained in an overflow tank; and
  wherein circulation liquid flows from the overflow tank to the liquid column by an application of a vacuum to create atmospheric column.

11. The buoyancy engine of claim 1,
  wherein the float return valve contains a ninety-degree bend.

12. The buoyancy engine of claim 11, wherein a connector is attached to the float return valve; and wherein the connector comprises an inlet and an outlet.

13. The buoyancy engine of claim 11, wherein the first seal, the second seal, the third seal, and the fourth seal are operated in the following steps in the order presented:
  releasing the first seal;
  restoring the first seal;
  releasing the second seal;
  restoring the second seal;
  exhausting a portion of liquid volume in the float return valve;
  releasing the third seal;
  restoring the third seal;
  releasing the fourth seal; and
  restoring the fourth seal.

\* \* \* \* \*